United States Patent
Finnilä et al.

(10) Patent No.: US 12,106,458 B2
(45) Date of Patent: Oct. 1, 2024

(54) METHOD AND DEVICE FOR IMAGE PROCESSING, AND STORAGE MEDIUM

(71) Applicant: BEIJING XIAOMI MOBILE SOFTWARE CO., LTD., Beijing (CN)

(72) Inventors: Tapio Finnilä, Tampere (FI); Petteri Kyrönlahti, Tampere (FI); Uygar Tuna, Tampere (FI); Ali Karaoglu, Tampere (FI)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 434 days.

(21) Appl. No.: 17/697,840

(22) Filed: Mar. 17, 2022

(65) Prior Publication Data
US 2022/0318966 A1 Oct. 6, 2022

(30) Foreign Application Priority Data
Mar. 30, 2021 (EP) .................................. 21166063

(51) Int. Cl.
*G06T 5/92* (2024.01)

(52) U.S. Cl.
CPC ...... *G06T 5/92* (2024.01); *G06T 2207/10024* (2013.01); *G06T 2207/20208* (2013.01)

(58) Field of Classification Search
CPC .... G06T 5/90; G06T 5/92; G06T 5/94; G06T 2207/20208; H04N 23/70; H04N 23/741; H04N 23/76
See application file for complete search history.

(56) References Cited

U.S. PATENT DOCUMENTS

| 12,028,523 B2* | 7/2024 | Baylon et al. ....... H04N 19/186 |
| 2017/0358063 A1 | 12/2017 | Chen et al. |
| 2018/0211370 A1 | 7/2018 | Chen et al. |

(Continued)

FOREIGN PATENT DOCUMENTS

EP 3913573 A1 11/2021

OTHER PUBLICATIONS

Nazneen A, Camera Tuning: Understanding the Image Signal Processor and ISP Tuning, Mar. 2, 2020, https://www.bathpartnertech.com/camera-tuning-understanding-the-image-signal-processor-and-isp-tuning/, (4p).

(Continued)

*Primary Examiner* — Andrew W Johns
(74) *Attorney, Agent, or Firm* — Arch & Lake LLP

(57) ABSTRACT

A method and device for image processing, and storage medium are provided. In the method, an initial image I is acquired; a pixel I(i) of the initial image is selected; a transfer function $f$ is applied to the pixel I(i) to acquire a transferred pixel $\tilde{I}(i)$, and the transfer function $f$ is determined on the basis of at least the pixel information of the selected pixel; a predetermined tone-mapping function is applied to the transferred pixel $\tilde{I}(i)$ to acquire a tone-mapped transferred pixel $\tilde{I}'(i)$; an inverse of the transfer function $f^{-1}$ is applied to the tone-mapped transferred pixel $\tilde{I}'(i)$ to acquire a tone-mapped final pixel I'(i). Herein, the steps are repeated for a plurality of pixels of the initial image I to generate a final image I', and for each of the plurality pixels the same tone-mapping function is applied.

20 Claims, 4 Drawing Sheets

(56) References Cited

U.S. PATENT DOCUMENTS

2019/0147572 A1 5/2019 Colaitis et al.
2019/0295229 A1* 9/2019 Yadid-Pecht et al. ............... H04N 23/80

OTHER PUBLICATIONS

"Histogram equalization", https://en.wikipedia.org/wiki/Histogram_equalization, (5p).

"Histogram Equalization", https://www.math.uci.edu/icamp/courses/math77c/demos/hist_eq.pdf. (3p).

Kim, J.Y., et al., "An advanced contrast enhancement using partially overlapped sub-block histogram equalization", IEEE Transactions on Circuits and Systems for Video Technology, vol. 11, No. 4, Apr. 2001, (10p).

Eilertsen, G, et al., A Comparative Review of Tone-Mapping Algorithms for High Dynamic Range Video, DOI: 10.1111/cgf. 13148, Eurographics 2017, V. Ostromoukov and M. Zwicker(Guest Editors), vol. 36 (2017), No. 2, STAR—State of The Art Report, (28p).

Paris, S. et al., "Local Laplacian Filters: Edge-aware Image Processing with a Laplacian Pyramid", https://sci-hub.se/10.1145/1964921.1964963, (11p).

Kuang et al: "iCAM06: A refined image appearance model for HDR image rendering", Journal of Visual Communication and Image Representation Academic Press, Inc, US, vol. 18, No. 5, Sep. 5, 2007), pp. 406-414, XP022231047, ISSN: 1047-3203, DOI: 10.1016/J. JVCIR.2007.06.003,(9p).

European Search Report in the European Application No. 21166063. 4, mailed on Oct. 4, 2021, (10p).

"Tone Mapping Explained", https://www.youtube.com/watch?v=bQoddOkkaAQ, Oct. 11, 2017, Find out the difference between Tone Mapping and HDR (High Dynamic Range) and how Aurora can create great results for both methods, (3p).

Display adaptive tone mapping—Further articles could be reached via google scholar: https://scholar.google.com/ scholar?hl=fi&as_sdt=0%2C5&q=tone+mapping&btnG =. (2p).

Contrast Enhancement—Further articles could be reached via google scholar: https://scholar.google.com/scholar?hl=fi&as_sdt=0%2C5&q=contrast+enhancement&btnG=&oq=contrast+en. (2p).

"How to use Dual Exposure on Google Pixel", https://www.youtube.com/watch?v=A_Oyp_1WkWY, Oct. 17, 2020, Watch this video to learn how to adjust highlights and shadows to get the best lighting on your Google Pixel with Dual Exposure, (5p).

\* cited by examiner

Local Adaptation Parameter (LAP) Grid
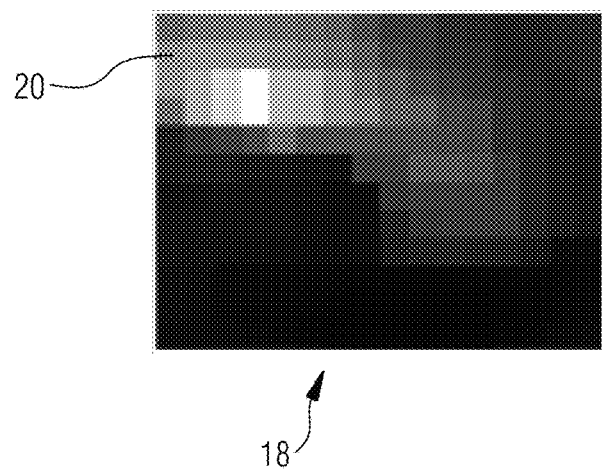
FIG.3B
RGB image
(no tone mapping)
RGB image
(without adaptation)
RGB image
(with adaptation)
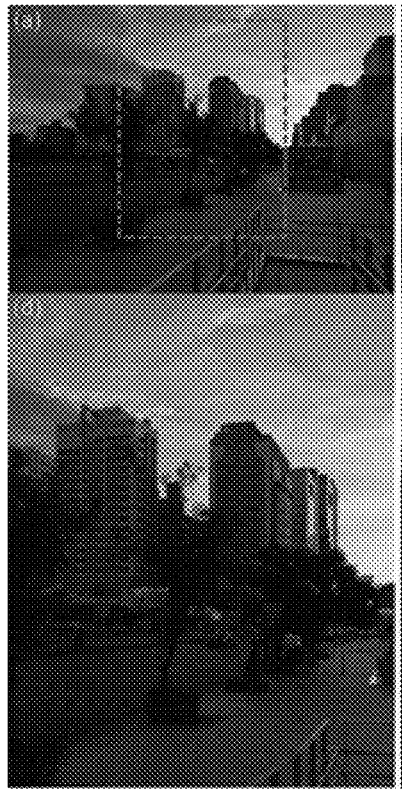
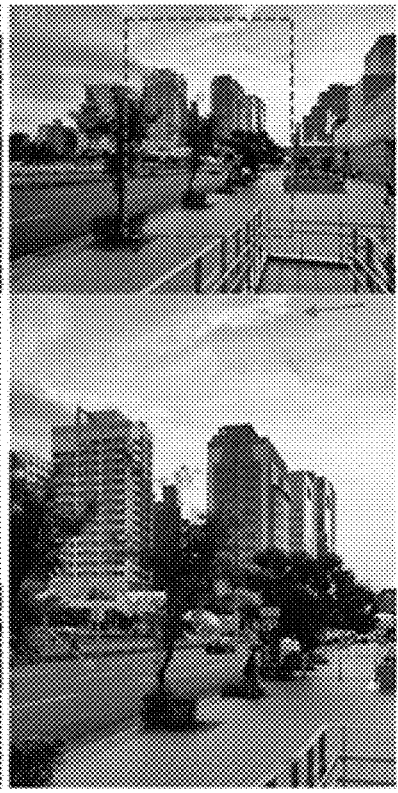
FIG.4A
FIG.4B
FIG.4C

METHOD AND DEVICE FOR IMAGE PROCESSING, AND STORAGE MEDIUM

CROSS-REFERENCE TO RELATED APPLICATION

This application is based upon and claims the priority of European Patent Application No. EP21166063.4, filed on Mar. 30, 2021, the content of which is incorporated herein by reference in its entirety for all purposes.

BACKGROUND

Photography has become more and more popular. Simultaneously, the demands on the quality of the images are increasing. Therein, information captured with a camera chip, such as a CMOS or the like, is further processed in order to acquire the final image. One important step of this processing is tone-mapping.

SUMMARY

The present disclosure relates to a method and device for image processing, and storage medium.

In an aspect of the present disclosure, a method for image processing is provided, in particular for tone-mapping, including the steps of: acquiring an initial image I; selecting a pixel I(i) of the initial image; applying a transfer function $f$ to the pixel I(i) to acquire a transferred pixel Ĩ(i), where the transfer function $f$ is determined on the basis of at least the pixel information of the selected pixel; applying a predetermined tone-mapping function to the transferred pixel Ĩ(i) to acquire a tone-mapped transferred pixel Ĩ'(i); applying an inverse of the transfer function $f^{-1}$ to the tone-mapped transferred pixel Ĩ'(i) to acquire a tone-mapped final pixel I'(i). Herein, steps b) to e) are repeated for a plurality of pixels of the initial image I in order to generate a final image I', wherein for each of the plurality pixels the same tone-mapping function is applied.

In a further aspect of the present disclosure, a device is provided comprising an image sensor and a processor, wherein the processor is configured to perform operations of: a) acquiring an initial image I; b) selecting a pixel I(i) of the initial image; c) applying a transfer function f to the pixel I(i) to acquire a transferred pixel Ĩ(i), wherein the transfer function f is determined on the basis of a pixel information of the selected pixel; d) applying a predetermined tone-mapping function to the transferred pixel Ĩ(i) to acquire a tone-mapped transferred pixel Ĩ'(i); e) applying an inverse of the transfer function $f^{-1}$ to the tone-mapped transferred pixel Ĩ'(i) to acquire a tone-mapped final pixel I'(i); wherein the steps b) to e) are repeated for a plurality of pixels of the initial image I to generate a final image I', the same tone-mapping function is applied for each of the plurality pixels.

In a further aspect, there is provided a non-transitory computer-readable storage medium having stored thereon computer-executable instructions that when executed by a processor, cause the processor to perform a method for image processing, the method comprising: a) acquiring an initial image I; b) selecting a pixel I(i) of the initial image; c) applying a transfer function f to the pixel I(i) to acquire a transferred pixel Ĩ(i), wherein the transfer function f is determined on the basis of a pixel information of the selected pixel; d) applying a predetermined tone-mapping function to the transferred pixel Ĩ(i) to acquire a tone-mapped transferred pixel Ĩ'(i); e) applying an inverse of the transfer function $f^{-1}$ to the tone-mapped transferred pixel PM to acquire a tone-mapped final pixel I'(i); wherein the steps b) to e) are repeated for a plurality of pixels of the initial image I to generate a final image I', the same tone-mapping function is applied for each of the plurality pixels.

It is to be understood that the above general descriptions and detailed descriptions below are only explanatory and not intended to limit the disclosure.

BRIEF DESCRIPTION OF THE DRAWINGS

In the following, the invention is further described with respect to the accompanying figures.

FIG. 3B shows an example of the local adaption parameter grid;

FIGS. 4A-4C show comparison of at least one example of the present disclosure.

DETAILED DESCRIPTION

Figure 1:
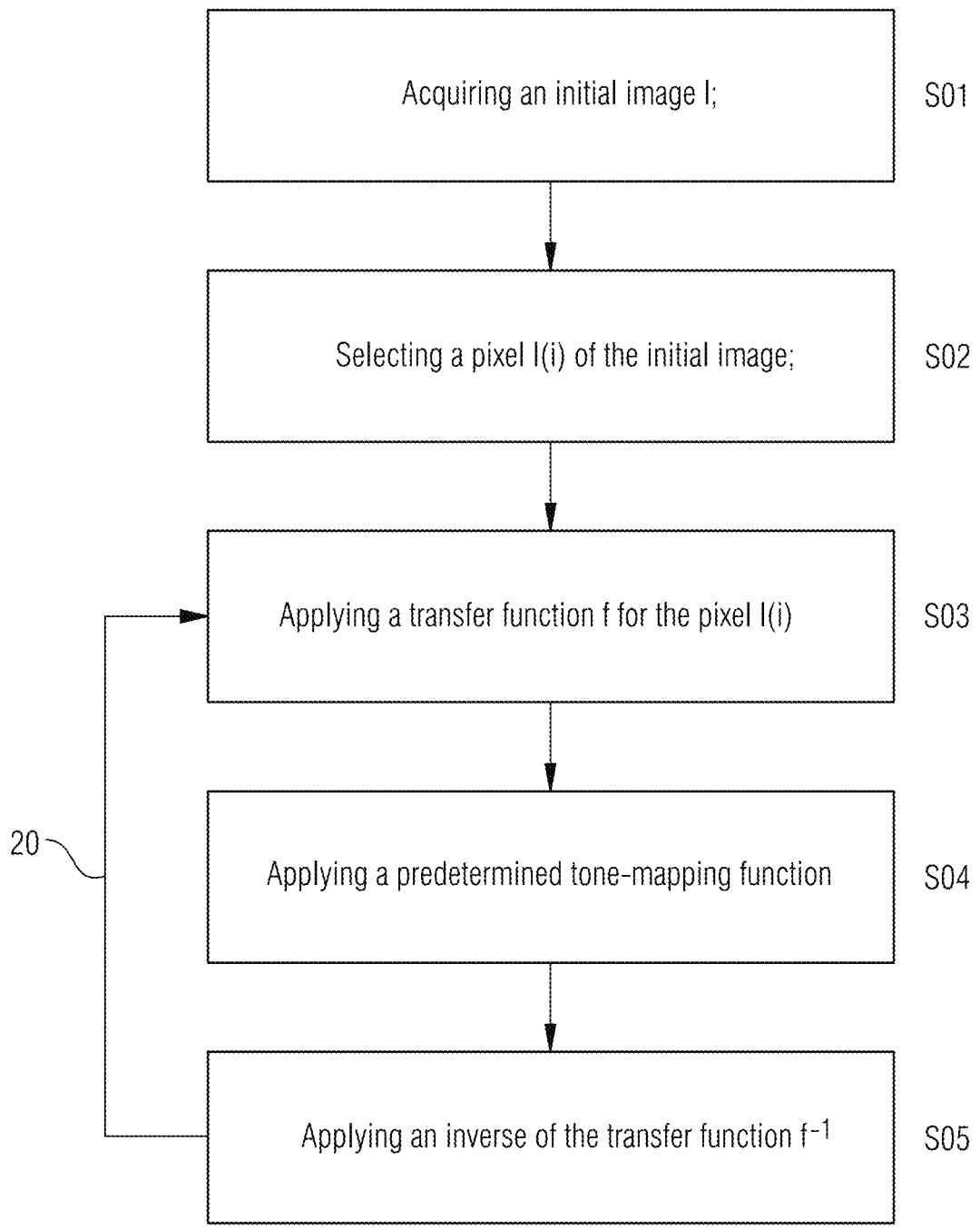
FIG. 1 is a a flow diagram of the method according to one or more examples of the present disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

Tone-mapping is the process of mapping the image pixels representing relatively higher dynamic range to a viewing environment (i.e. displaying media) with relatively lower dynamic range. While doing this, tone-mapping process is responsible to provide images to be represented as close as possible to the real-world scene. Tone-mapping includes both brightness and contrast enhancement sub-algorithms to generate subjectively pleasing images. Tone-mapping algorithms can be targeted for a sole algorithm (e.g. as a post-processing algorithm) or can be implemented as a part of the image processing pipeline also known as Image Signal Processor (ISP) pipeline. The ISP may be implemented in software, firmware, hardware or in a dedicated processor. The ISP can also be implemented in a simulation environment which may be used to develop the algorithms for the algorithms being developed for end-user devices.

Common global and local tone-mapping algorithms rely on the decomposition of the image into multiple-layers and enhancement of each layer independently before collapsing them back into the image. Laplacian pyramid based local tone-mapping algorithm (TM) is one of this kind of algorithms which is regarded as the state-of-the-art algorithm such as known from S. Paris, S. W. Hasinoff, J. Kautz, Local Laplacian Filters: "Edge-aware Image Processing with a Laplacian Pyramid". These multi-scale image-based tone-mapping algorithms are not favorable in the industry because of the high line-buffer cost (i.e. large footprint in the hardware). Therefore, instead of multi-layer decomposition-based tone-mapping algorithms, in the industry, grid-based local tone-mapping algorithms are used. Therein, the image is mapped onto a grid wherein each node of the grid provides a parameter of a certain area of the image. However, the grid-based tone-mapping algorithms suffer from the large number of parameters required for the algorithm. This increases the bandwidth cost, which is not favoured in the real time applications. A further drawback of the grid-based solutions is that, depending on the interpolation algorithm used, they might produce halos in the high contrast edges. These halos may be avoided if more advanced interpolation methods are used. However, advanced interpolation methods require additional line buffers, thus increasing the hardware implementation cost.

Referring to FIG. 1 showing a flow diagram of the method for image processing, in particular for tone-mapping.

In step S01 an initial image I is acquired for example by an image sensor of a camera device or a mobile terminal comprising a camera.

In step S02, a pixel I(i) of the initial image is selected.

In step S03 a transfer function f is applied to the pixel I(i) to acquire a transferred pixel RD. By the transfer function f the selected pixel I(i) is transferred into a locally invariant image space. Therein, the transfer function f is determined on the basis of at least the pixel information of the selected pixel I(i). Therein, in at least example, the transfer function f is for example monotonically increasing and invertible. In at least example, the function type (such as Gamma-function, exponential function, polynomial function of a certain degree or the like) is preset and fixed for the whole initial image and the function is only adapted in its one or more function parameters, i.e. function constants.

Therein, the pixel information may refer to one or more color channels of the respective color space and/or the luminance. For the example of the Lab color space (also referred to L*a*b* color space), the pixel information used for determining the grid value of the grid might be the a-channel, the b-channel, the L-channel or more than of these channels combinedly. Therein, it is also referred to the L-channel as luminosity, luma, or lightness.

In step S04 a predetermined tone-mapping function is applied to the transferred pixel Ĩ(i) to acquire a tone-mapped transferred pixel Ĩ'(i);

In step S05 an inverse of the transfer function $f^{-1}$ is applied to the tone-mapped transferred pixel Ĩ'(i) to acquire a tone-mapped final pixel I'(i) back in the original image space.

Therein, according to the invention, steps S02 to S05 are repeated for a plurality of pixels of the initial image I in order to generate a final image I', wherein for each of the plurality pixels the same tone-mapping function is used. Thus, it is not necessary anymore to adapt the respective tone-mapping functions to the individual pixels I(i) of the initial image. Instead, the situation is reversed in at least one example of the present disclosure in that the initial image is mapped into the locally invariant image space by the transfer function, wherein the transfer function is adapted to the respective pixels. Thus, it is not necessary anymore to provide or adjust numerous tone-mapping functions since the transfer function f is adapted accordingly and the number of necessary parameters can be reduced thereby improving the bandwidth and performance of the tone-mapping process.

Figure 2:
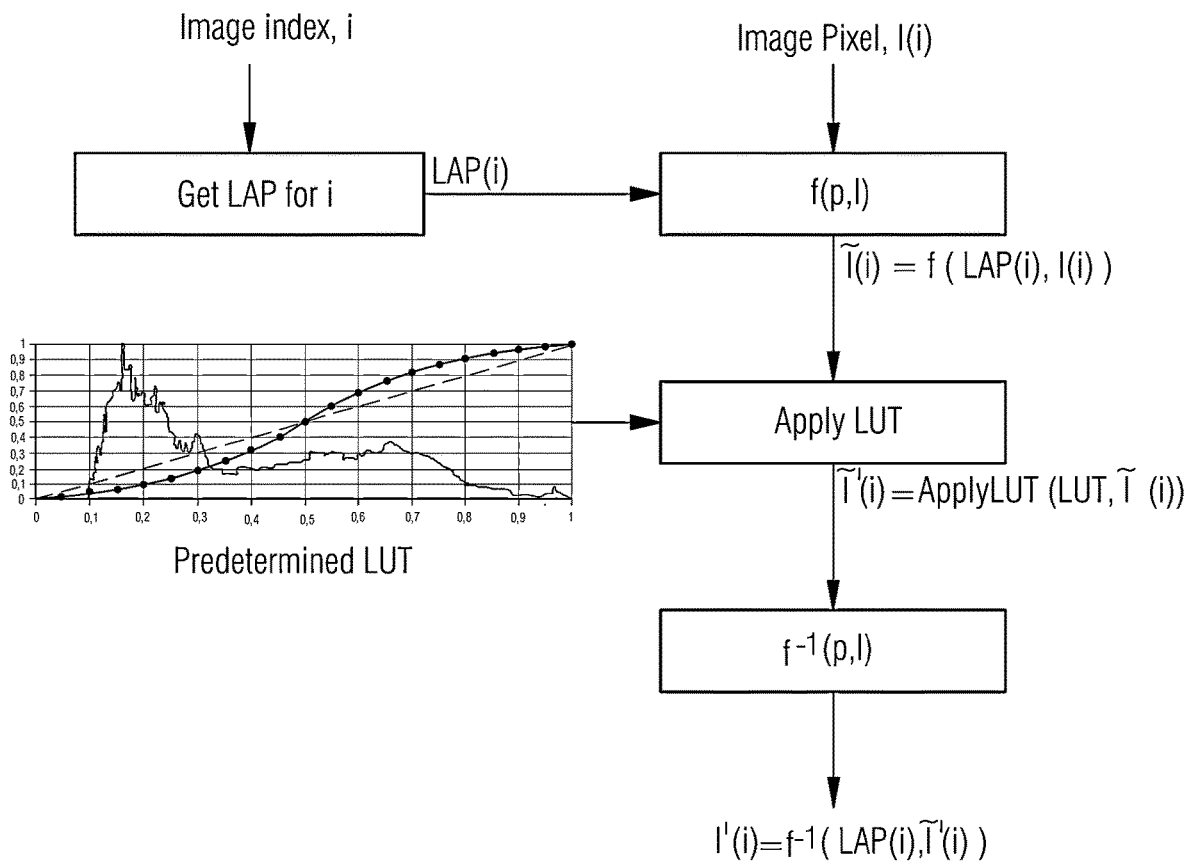
FIG. 2 is a a block diagram of the method according to one or more examples of the present disclosure.
Figure 3A:
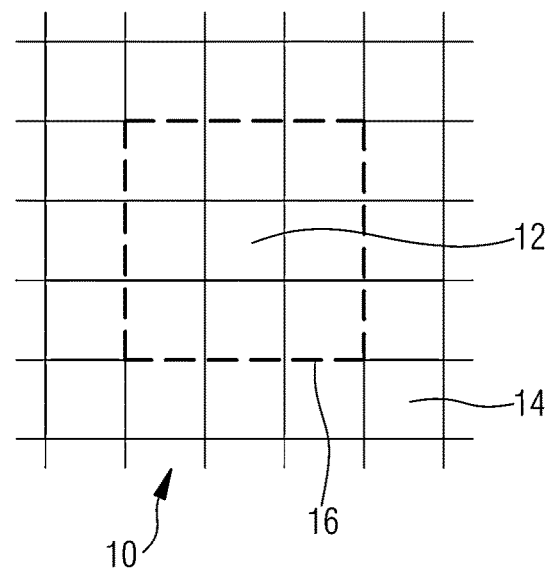
FIG. 3A shows an example of the present disclosure to determine the respective transfer function.

Referring to FIG. 2, first for a pixel index i a local adaption parameter (LAP) is acquired. Referring to FIG. 3A, in order to determine the LAP for a given selected pixel 12 (denoted by LAP(i)), pixels in an area around the selected pixel 12 are considered. In the example of FIG. 3A pixels in a 3×3 square 16 are considered. However, at least one example of the present disclosure is not limited to a specific number of pixels considered to determine the LAP nor to a specific arrangement of the considered pixels being a square around the selected pixel 12. Upon applying an interpolation algorithm, the LAP for the selected pixel 12 is calculated. Therein, the interpolation algorithm might be averaging the pixel information of the pixels encompassed by the square 16 considered for determining the LAP(i) of the selected pixel 12 or the like. The pixel information may include one or more of the color channels in the respective color space and/or the luminance. In an example, the LAP is based only on the luminance. Thus, for the example of the Lab color space, only the L-channel is considered for determining the LAP of the selected pixel 12.

FIG. 3B shows a local adaption parameter grid 18 for an initial image, wherein each pixel of the initial image is assigned to a certain grid node 20. Each grid node 20 has a LAP grid value calculated on the basis of the pixel information of the assigned pixels of the respective grid node 20. Therein, in the example of FIG. 3B, the initial image is represented by a 16×12 LAP grid 18. However, the number of grid nodes in the grid can be freely selected and is not limited to the example of FIG. 3B. Selection of the number of nodes can be done by a present number being fixed for several initial images, on the basis of the initial image, for example related to the contrast change in the image, or might be set by the user. Therein, for a large number of nodes, the present method applies a local adaption of the respective area of the initial image, while with a low number of nodes a global adaption is applied. The determination (construction, creating) of the LAP grid could be done both in the hardware and software, i.e. implemented as learning based algorithms in the software.

The determination of the LAP grid values might be dependent on the transfer function f. In case the LAP grid is intended to be calculated in the software, the algorithm would require additional grid information such as local means (or averages), which provides an average over each pixel assigned to the respective node. This grid might be denoted as MG (MeanGrid). This grid might be calculated in the hardware and passed to software. Assuming that the function $f$ is a Gamma operation, then each LAP grid value shall map the corresponding MG value to the value of 0.5 (which is the inflection point of the contrast manipulating curve). In case the inflection point of the given LUT changes, this should be changed also. Therefore, the LAP for the grid node j, LAP(j) is:

$$LAP(j)=\log(0.5)/\log(MG(j))$$

In another example, instead of a Gamma operation as function, just a gaining operation (i.e. pixel is just multiplied with the given value) is used, then the LAP(j) would be calculated by:

$$LAP(j)=0.5/MG(j)$$

meaning that the local average is pulled towards 0.5 with the application of the function $f$.

In another example the LAP for the given index, i, can be calculated using any image interpolation algorithm, interpolating the LAP on the basis of the pixel location given by the pixel index i, the neighboring nodes of the LAP grid and/or the pixel information of the neighboring pixels. For instance, for this interpolation, simple algorithms such as bilinear, bicubic interpolation methods could be used as well as more advanced interpolation algorithms such as bilateral or intensity distance-based interpolation algorithms. Depending on the employed interpolation strategy, the LAP grid may be accompanied by additional information. For example, for the implementation of an image intensity-based guided interpolation, a low-resolution local averages grid may be utilized.

Referring back to FIG. 2, the LAP of the selected pixel I(i) is used to determine the transfer function $f$, and in an example, the function parameter of $f$, in order to transfer the image pixel I(i) into a locally invariant image space and map the pixel I(i) onto the inflection point of the tone-mapping function. In order to achieve the desired contrast enhancement effect, the incoming image pixel, I(i) must be mapped using the interpolated LAP(i). This forward mapping of the incoming image pixel is performed by a function, $f(p,I)$. The forward mapping function is complementary to the LAP grid and both are designed in agreement with each together as exemplified above. There are various ways of implementing this function. For instance, it can be implemented as generic as a look-up-table (LUT) operator, or it can be as dedicated as a special function like a Gamma operator. Thus, by the transfer function the pixel I(i) of the initial image I is mapped to the transferred pixel Ĩ(i) in the locally invariant image space. Afterward a predetermined tone-mapping function is applied. Therein, the tone-mapping function might be implemented as the look-up table (LUT). After the selected image pixel is mapped to the locally invariant image space, the contrast/brightness manipulating LUT is applied to acquire a tone-mapped pixel Ĩ'(i) in the locally invariant image space. This process can be well implemented as a typical LUT operation or can also be implemented otherwise with a parametric or a dedicated function as a part of hardware. Thus, by applying the LUT a tone-mapped pixel in the locally invariant image space is created. After the image pixel is contrast and/or brightness manipulated in the locally invariant image space, it needs to be remapped back to the original image space. This inverse remapping is achieved by the inverse mapping function $f^{-1}(p,I)$ which also uses the interpolated local adaptation parameter, LAP(i), of the selected pixel I(i). Thus, by the inverse transfer function $f^{-1}$ the tone-mapped pixel Ĩ'(i) is mapped back to the initial colour space forming the tone-mapped final pixel Î'(i).

At least one example of the present disclosure provides an efficient and effective local contrast enhancement. Since this invention does not require any line buffers, it is possible to be implemented efficiently by hardware. The amount of necessary parameters is not as large as other grid-based tone-mapping algorithms typically used in the industry. Therefore, it requires a smaller bandwidth. Further, the method is fully scalable between local and global contrast enhancement operations, for the given run-time and scene content adaptation requirements. When the local adaptation parameters in the LAP grid are set to be closer to each other, i.e. reducing the number of nodes within the LAP grid, the algorithm starts operating more in global manner. When these parameters differ from each other, increasing the number of nodes in the LAP grid, the process becomes more locally oriented. The scalability of the ISP algorithms is crucial for example when the algorithm is required to be run in various frame rates, varying contents, etc.

Below is an example of at least one example of the present disclosure. In especially high-dynamic range (HDR) scenes, a global contrast enhancement LUT cannot be utilized to bring up details both in shadow and bright regions. The reason behind this is the fact the in global operations the tones are not treated in relation to the local regions. For example, the mid-tones in the highlights (which are relatively dark) and in the shadows (those mid-tones are relatively bright) are not distinguished from each other and treated the same. Therefore, the local contrast enhancement operations are needed to bring out the local details to generate pleasing images. In FIGS. 4A-4C, an HDR image is shown processed without tone-mapping (FIG. 4A), without any local adaptation for the contrast enhancement (FIG. 4B) and with local contrast adaptation (done by the method according to at least one example of the present disclosure) (FIG. 4C). As seen from the right-most column, the local operations are especially responsible for bringing the local details (see the contrast in the clouds in the sky, in the trees and buildings). These local details can only be enhanced up-to certain level in case no local adaptation is used for contrast enhancement.

Figure 5:
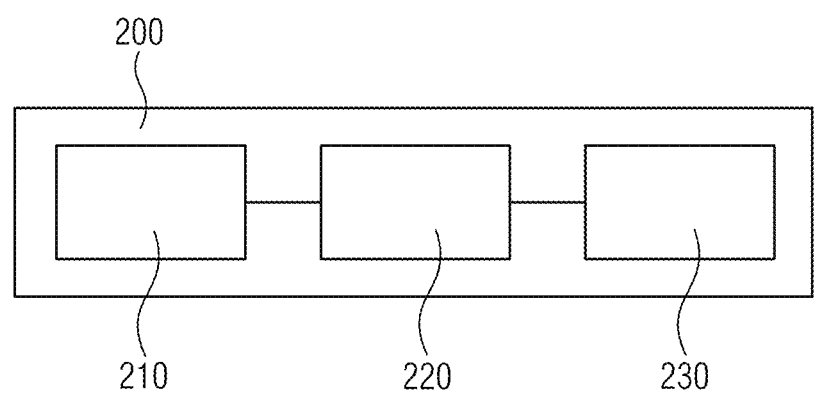
FIG. 5 shows a a device according to one or more examples of the present disclosure.

Referring to FIG. 5 showing a device such as a terminal device 200 including a camera sensor or image sensor 220 which is connected to a processor 240. Further, the processor 240 is connected to a memory storage 260. The memory storage 260 might store instructions to be performed by the processor 240 to transform the raw image data captured by the image sensor 220 and providing the final image to a user of the terminal device 200. Therein, the processor 240 and memory 260 can be implemented as dedicated image processor implementing the ISP in hardware or can implement the ISP in software stored in the storage memory 260 processed by the processor 240.

What is claimed is:
1. A method for image processing, comprising:
a) acquiring an initial image I;
b) selecting a pixel I(i) of the initial image;
c) applying a transfer function $f$ to the pixel I(i) to acquire a transferred pixel Ĩ(i), wherein the transfer function $f$ is determined based on a pixel information of the selected pixel;
d) applying a predetermined tone-mapping function to the transferred pixel Ĩ(i) to acquire a tone-mapped transferred pixel Ĩ'(i);

e) applying an inverse of the transfer function $f^{-1}$ to the tone-mapped transferred pixel $\tilde{I}'(i)$ to acquire a tone-mapped final pixel $I'(i)$;

wherein steps b) to e) are repeated for a plurality of pixels of the initial image I to generate a final image I', a same tone-mapping function is applied for each of the plurality pixels.

2. The method according to claim 1, wherein a same predetermined tone-mapping function is applied for all pixels of the initial image.

3. The method according to claim 1, wherein the tone-mapping function is provided by a look-up table (LUT).

4. The method according to claim 1, wherein the tone-mapping function implements at least one of a contrast manipulation or a brightness manipulation.

5. The method according to claim 1, wherein the transfer function $f$ is determined based on a plurality of pixels next to the selected pixel $I(i)$ arranged in a square around the selected pixel $I(i)$.

6. The method according to claim 1, wherein the transfer function $f$ is determined based on a local adaption parameter of a grid, wherein each pixel is assigned to a grid node and the respective local adaption parameter of each node is determined according to all pixels assigned to the respective grid node.

7. The method according to claim 6, wherein the transfer function $f$ is determined by interpolation based on at least one of the local adaption parameter of neighboring nodes or pixel information of pixels of the initial image.

8. The method according to claim 6, wherein the transfer function $f$ is determined on a luminance of pixels.

9. The method according to claim 1, wherein the transfer function $f$ is implemented as Gamma-function.

10. A device comprising an image sensor and a processor, wherein the processor is configured to perform operations of:
  a) acquiring an initial image I;
  b) selecting a pixel $I(i)$ of the initial image;
  c) applying a transfer function $f$ to the pixel $I(i)$ to acquire a transferred pixel $\tilde{I}(i)$, wherein the transfer function $f$ is determined based on a pixel information of the selected pixel;
  d) applying a predetermined tone-mapping function to the transferred pixel $\tilde{I}(i)$ to acquire a tone-mapped transferred pixel $\tilde{I}'(i)$;
  e) applying an inverse of the transfer function $f^{-1}$ to the tone-mapped transferred pixel $\tilde{I}'(i)$ to acquire a tone-mapped final pixel $I'(i)$;
  wherein steps b) to e) are repeated for a plurality of pixels of the initial image I to generate a final image I', a same tone-mapping function is applied for each of the plurality pixels.

11. The device according to claim 10, wherein a same predetermined tone-mapping function is applied for all pixels of the initial image.

12. The device according to claim 10, wherein the tone-mapping function is provided by a look-up table(LUT).

13. The device according to claim 10, wherein the tone-mapping function implements at least one of a contrast manipulation or a brightness manipulation.

14. The device according to claim 10, wherein the transfer function $f$ is determined based on a plurality of pixels next to the selected pixel $I(i)$ arranged in a square around the selected pixel $I(i)$.

15. The device according to claim 10, wherein the transfer function $f$ is determined based on a local adaption parameter of a grid, wherein each pixel is assigned to a grid node and the respective local adaption parameter of each node is determined according to all pixels assigned to the respective grid node.

16. The device according to claim 15, wherein the transfer function $f$ is determined by interpolation based on at least one of the local adaption parameter of neighboring nodes or pixel information of pixels of the initial image.

17. The device according to claim 15, wherein the transfer function $f$ is determined on a luminance of pixels.

18. The device according to claim 10, wherein the transfer function $f$ is implemented as Gamma-function.

19. A non-transitory computer-readable storage medium having stored thereon computer-executable instructions that when executed by a processor, cause the processor to perform a method for image processing, the method comprising:
  a) acquiring an initial image I;
  b) selecting a pixel $I(i)$ of the initial image;
  c) applying a transfer function $f$ to the pixel $I(i)$ to acquire a transferred pixel $\tilde{I}(i)$, wherein the transfer function $f$ is determined based on a pixel information of the selected pixel;
  d) applying a predetermined tone-mapping function to the transferred pixel $\tilde{I}(i)$ to acquire a tone-mapped transferred pixel $\tilde{I}'(i)$;
  e) applying (an inverse of the transfer function $f^{-1}$ to the tone-mapped transferred pixel $\tilde{I}'(i)$ to acquire a tone-mapped final pixel $I'(i)$;
  wherein steps b) to e) are repeated for a plurality of pixels of the initial image I to generate a final image I', a same tone-mapping function is applied for each of the plurality pixels.

20. The non-transitory computer-readable storage medium according to claim 19, wherein a same predetermined tone-mapping function is applied for all pixels of the initial image.

* * * * *